United States Patent
Suzuki

(10) Patent No.: US 7,380,620 B2
(45) Date of Patent: Jun. 3, 2008

(54) CONTROL DEVICE OF INTERNAL COMBUSTION ENGINE AND CONTROL METHOD OF INTERNAL COMBUSTION ENGINE

(75) Inventor: Takashi Suzuki, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 8 days.

(21) Appl. No.: 11/492,979

(22) Filed: Jul. 26, 2006

(65) Prior Publication Data
US 2007/0029122 A1  Feb. 8, 2007

(30) Foreign Application Priority Data
Aug. 5, 2005  (JP) ............... 2005-228091

(51) Int. Cl.
*B60K 6/00* (2007.10)
(52) U.S. Cl. .................... 180/65.2; 123/491
(58) Field of Classification Search ............ 180/65.2; 123/491
See application file for complete search history.

(56) References Cited

U.S. PATENT DOCUMENTS 6,522,024 B1* 2/2003 Takaoka et al. ......... 290/40 C

2004/0060540 A1* 4/2004 Fuwa .................. 123/346
2004/0134698 A1* 7/2004 Yamamoto et al. ....... 180/65.2

FOREIGN PATENT DOCUMENTS

JP  A 2004-68621  3/2004
JP  A 2004-76670  3/2004

* cited by examiner

*Primary Examiner*—Christopher Ellis
*Assistant Examiner*—Katy Meyer
(74) *Attorney, Agent, or Firm*—Oliff & Berridge, PLC

(57) ABSTRACT

An engine includes a plurality of cylinders and fuel injection valves provided correspondingly to the plurality of respective cylinders. A vehicle includes a motor generator for forcibly rotating a crankshaft. A control device of an internal combustion engine controls the respective fuel injection valves so that an injection quantity of a last injection becomes smaller than an injection quantity of a first injection out of injection quantities of fuel injected in order in correspondence with the respective cylinders in a first cycle of fuel injection from a stopped state of the crankshaft to an end of a first fuel injection from each of the fuel injection valves.

16 Claims, 7 Drawing Sheets

CONTROL DEVICE OF INTERNAL COMBUSTION ENGINE AND CONTROL METHOD OF INTERNAL COMBUSTION ENGINE

This nonprovisional application is based on Japanese Patent Application No. 2005-228091 filed with the Japan Patent Office on Aug. 5, 2005, the entire contents of which are hereby incorporated by reference.

BACKGROUND OF THE INVENTION

1. Field of the Invention

The present invention relates to a control device of an internal combustion engine and particularly to a control device for performing a start time control of an internal combustion engine having a plurality of cylinders.

2. Description of the Background Art

In an internal combustion engine, if an air-fuel ratio in an engine cylinder becomes excessively rich during operation, a large quantity of unburned hydrocarbon (HC) is generated. If the air-fuel ratio becomes excessively lean, combustion flame is not propagated thereby causing misfire, and a large quantity of unburned HC is generated in this case, too. In other words, in order to suppress generation of the unburned HC, it is necessary to maintain the air-fuel ratio at a stoichiometric air-fuel ratio or at a slightly leaner ratio. This also holds true for the engine start time.

On the other hand, if fuel injection is carried out at the engine start time, a large quantity of injected fuel adheres in a form of liquid to an inner wall face of an intake port in a case of an internal combustion engine where the fuel is injected into the intake port. Therefore, the air-fuel mixture lead into the cylinder is formed of a part of the injected fuel. Even in a case of an internal combustion engine where the fuel is directly injected into the cylinder, the injected fuel adheres in a form of liquid to a top face of the piston and an inner wall face of the cylinder.

The fuel is gradually vaporized to form an air-fuel mixture by the time an intake valve closes in an intake stroke in a case of the fuel that has adhered to the inner wall face of the intake port, and by the time the piston reaches a top dead center in a compression stroke in a case of the fuel that has adhered to the top face of the piston. This air-fuel mixture makes up a sizable proportion of the whole air-fuel mixture formed in the engine cylinder. Therefore, the air-fuel ratio of the air-fuel mixture formed in the engine cylinder is seriously affected by a quantity of fuel vaporized from the wall face.

In the case of the internal combustion engine where the fuel is directly injected into the cylinder, a quantity of fuel vaporized from the wall face is proportional to the time that elapsed before the piston moves from a bottom dead center to a vicinity of a compression top dead center. The shorter this time is, the smaller quantity of fuel is vaporized from the wall face. On the other hand, the time that elapsed before the piston reaches a vicinity of a compression top dead center is inversely proportional to an engine speed. Also in the case of the internal combustion engine where the fuel is injected into the intake port, the higher the engine speed is, the shorter the time that elapses between injection and the end of intake becomes. Therefore, the higher the engine speed is, the smaller quantity of fuel is vaporized from the wall face. The higher the engine speed is, the larger quantity of fuel is required to be injected.

Japanese Patent Application Laid-open No. 2004-068621 discloses a technique of increasing an injection quantity of fuel injected in order into respective cylinders in the first cycle because the engine speed gradually increases at the start time.

In recent years, a hybrid automobile has been receiving much attention as an environment-friendly automobile. The hybrid automobile is an automobile powered by a conventional engine and by a direct-current power supply, an inverter, and a motor driven by the inverter. In other words, the engine is driven to obtain mechanical power and direct voltage from the direct-current power supply is converted to alternating voltage by the inverter, and the motor is rotated by the alternating voltage obtained by conversion to thereby obtain mechanical power.

Among this type of vehicles, there is one in which an engine is cranked by using a motor generator that has greater driving performance than a normal starter motor and functions also as a generator. In such a vehicle, the engine speed is already high (e.g., 800 rpm) when the fuel injection is started at a time of cranking of the internal combustion engine.

At a start time of the internal combustion engine, two factors, i.e., vaporization time and negative pressure in the intake port control the vaporization of the fuel. There is almost no difference in the vaporization time from one cylinder to another when the engine speed is already high, and therefore the negative pressure in each cylinder affects vaporization more than the difference in the vaporization time from one cylinder to another. In this case, higher negative pressure (lower pressure) is advantageous to vaporization of the fuel.

At the start time of such a vehicle, because the negative pressure in the intake port is in a transient state, the later cylinder in the order of injection has an advantage in vaporization of the fuel and requires a smaller quantity of injection contrary to the technique disclosed in Japanese Patent Application Laid-open No. 2004-068621.

It is also conceivable that the fuel injection is started after the engine is rotated by the motor generator and then the negative pressure is stabilized. However, the fuel is discharged from a fuel injection valve into the port when the vehicle is left unattended for a long time. In this case, such fuel is discharged from the engine without being burned. As a result, an emission quantity of unburned HC is rather increased in some cases.

SUMMARY OF THE INVENTION

It is an object of the present invention to provide a control device of an internal combustion engine where emission of unburned hydrocarbon is suppressed.

According to the invention, in summary, there is provided a control device of an internal combustion engine mounted on a vehicle, wherein the internal combustion engine includes a plurality of cylinders and fuel injection valves provided correspondingly to the plurality of respective cylinders, the vehicle includes a first rotating electric machine for forcibly rotating a crankshaft of the internal combustion engine, the control device of the internal combustion engine controls the respective fuel injection valves so that an injection quantity of the last injection becomes smaller than an injection quantity of the first injection out of injection quantities of fuel injected in order in correspondence with the respective cylinders in the first cycle of fuel injection from a stopped state of the crankshaft to an end of the first fuel injection from each of the fuel injection valves.

The first rotating electric machine is preferably formed to be able to rotate the crankshaft of the internal combustion engine at a speed equal to or greater than an idling speed of the internal combustion engine in a stopped state of operation of the internal combustion engine.

The vehicle preferably further includes a second rotating electric machine used together with the internal combustion engine so as to generate torque for rotating a wheel.

It is more preferable that the vehicle further includes a power split mechanism having three shafts respectively mechanically coupled to the crankshaft of the internal combustion engine, a rotation shaft of the first rotating electric machine, and a rotation shaft of the second rotating electric machine, and formed so that, if rotation speeds of any two of the three shafts are determined, a rotation speed of the other shaft is forcibly determined.

The control device of the internal combustion engine preferably controls a control variable of the internal combustion engine different from the fuel injection quantity at a constant value until negative pressure in an intake pipe of the internal combustion engine is stabilized.

It is more preferable that the control variable of the internal combustion engine includes an advance angle of a variable valve opening timing.

It is more preferable that the control variable of the internal combustion engine includes a valve opening angle of a throttle valve.

It is more preferable that the control device of the internal combustion engine retains angle information on the crankshaft at a stop time of the internal combustion engine and determines the constant value of the control variable based on the retained angle information.

According to another aspect of the invention, there is provided a control method of an internal combustion engine which is mounted on a vehicle including a first rotating electric machine, and which includes a plurality of cylinders, fuel injection valves provided correspondingly to the plurality of respective cylinders, and a crankshaft, the crankshaft being forcibly rotated by the first rotating electric machine, the method including the steps of determining whether or not it is a first cycle of fuel injection from a stopped state of the crankshaft to an end of a first fuel injection from each of the fuel injection valves, and determining injection quantities of fuel injected in order in correspondence with the plurality of cylinders so that an injection quantity of a last injection in the first cycle becomes smaller than an injection quantity of a first injection in the first cycle.

The first rotating electric machine is preferably formed to be able to rotate the crankshaft of the internal combustion engine at a speed equal to or greater than an idling speed of the internal combustion engine in a stopped state of operation of the internal combustion engine.

The vehicle preferably further includes a second rotating electric machine used together with the internal combustion engine so as to generate torque for rotating a wheel.

It is more preferable that the vehicle further includes a power split mechanism having three shafts respectively mechanically coupled to the crankshaft of the internal combustion engine, a rotation shaft of the first rotating electric machine, and a rotation shaft of the second rotating electric machine, and formed so that, if rotation speeds of any two of the three shafts are determined, a rotation speed of the other shaft is forcibly determined.

The control method preferably further includes the steps of determining whether or not negative pressure in an intake pipe of the internal combustion engine has been stabilized, and controlling a control variable of the internal combustion engine different from the fuel injection quantity at a constant value when the negative pressure has not been stabilized.

It is more preferable that the control variable of the internal combustion engine includes an advance angle of a variable valve opening timing.

It is more preferable that the control variable of the internal combustion engine includes a valve opening angle of a throttle valve.

It is more preferable that the control method further includes the step of retaining angle information on the crankshaft at a stop time of the internal combustion engine and that the controlling step determines the constant value of the control variable based on the retained angle information.

With the present invention, it is possible to reduce an emission quantity of unburned hydrocarbon from the internal combustion engine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
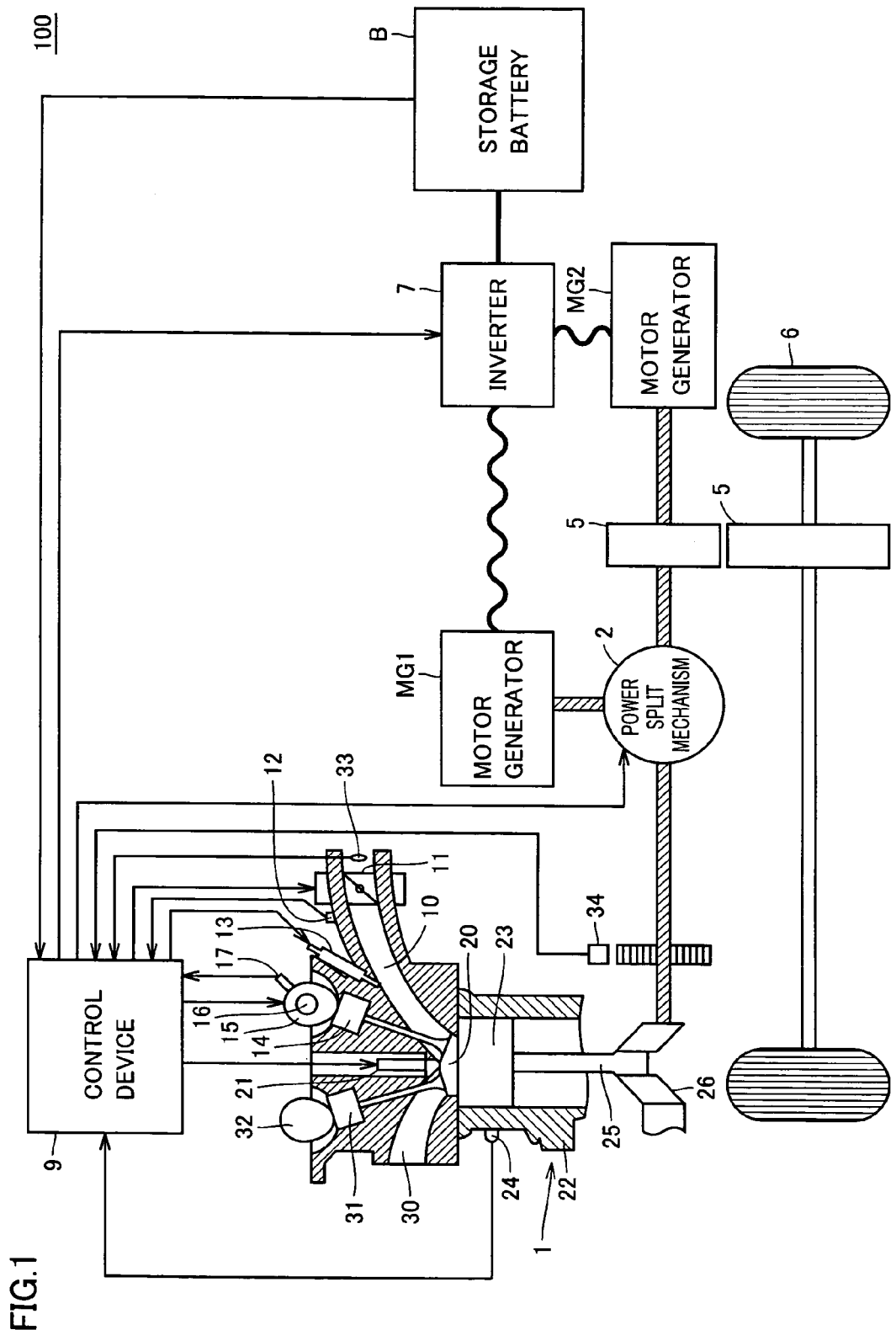
FIG. 1 is a block diagram of a main portion of a hybrid vehicle 100 including a control device of an internal combustion engine according to the present invention.

Embodiments of the present invention will be described in detail with reference to the drawings. In the drawings, the same or corresponding portions are provided with the same reference numerals and description of them will not be repeated.

Embodiment 1

FIG. 1 is a block diagram of a main portion of a hybrid vehicle 100 including a control device of an internal combustion engine according to the invention.

With reference to FIG. 1, hybrid vehicle 100 includes an engine (internal combustion engine) 1, a power split mechanism 2, motor generators MG1 and MG2, an inverter 7, a storage battery B, a control device 9, speed reducers 5, and driving wheels 6.

Engine 1 receives supply of fuel from a fuel tank (not shown) and is started by motor generator MG1.

Power split mechanism 2 utilizes planetary gears and includes first to third rotation shafts. If rotation of any two of these rotation shafts is determined, rotation of the other rotation shaft is forcibly determined. As power split mechanism 2, a planetary gear mechanism having a sun gear, a planetary carrier, and a ring gear as three rotation shafts can be used, for example. The first rotation shaft of power split mechanism 2 is mechanically connected to an output shaft of engine 1. The second rotation shaft of power split mechanism 2 is mechanically connected to a rotor of motor generator MG1. The third rotation shaft of power split mechanism 2 is mechanically connected to a rotor of motor generator MG2. Motor generator MG1 mainly works as a generator, and motor generator MG2 mainly works as a motor for driving driving wheels 6.

Driving force of engine 1 is transmitted by power split mechanism 2 to one or both of motor generator MG1 and motor generator MG2. Driving wheels 6 of the vehicle are connected to the rotor of motor generator MG2 through speed reducer 5. Motor generator MG1 and motor generator MG2 are driven by inverter 7, and electric power is supplied to inverter 7 from storage battery B.

Control device 9 controls engine 1, inverter 7, and power split mechanism 2 thereby to integrate and control a driving system of vehicle 100. Control device 9 may include an engine controlling ECU, an inverter controlling ECU, a battery monitoring ECU, and the like.

Next, the detailed structure of engine 1 will be described. In an intake pipe 10 connected to engine 1, an air flow meter 33 for measuring an air flow rate, an electronically controlled throttle 11 an opening degree of which is controlled by control device 9, a negative pressure sensor 12 for detecting negative pressure in intake pipe 10, and an injector 13 for supplying fuel are disposed.

An intake valve 14 is driven by a cam 15, and cam 15 is controlled by a variable valve timing (VVT) mechanism 16 for regulating an opening/closing timing of intake valve 14 under instructions from control device 9. Cam 15 is mounted with a cam position sensor 17.

VVT 16 regulates timing of opening of intake valve 14 to thereby regulate duration of a valve overlap during that both intake valve 14 and exhaust valve 31 are open.

In a combustion chamber 20, a spark plug 21 is disposed. Reciprocating motion of a piston 23 in a cylinder 22 is transmitted to power split mechanism 2 through a connecting rod 25 and a crankshaft 26. Crankshaft 26 is mounted with a crank angle sensor 34 for detecting a crank angle. A crankcase forming cylinder 22 is mounted with a water temperature sensor 24 for detecting a coolant temperature.

On an exhaust side of combustion chamber 20, an exhaust pipe 30 is connected at a tip of exhaust valve 31, and exhaust valve 31 is driven by a cam 32.

In such a hybrid car, efficient driving is possible by changing distribution of the driving force by power split mechanism 2.

To put it concretely, engine 1 is efficient in a high-speed rotation range and motor generator MG2 is efficient in a low-speed rotation range. Therefore, driving is carried out by mainly using motor generator MG2 during low-speed driving. During normal driving, electric power is generated by using motor generator MG1 with a part of driving force of engine 1. By utilizing the generated electric power, the driving force is assisted by motor generator MG2 and storage battery B is charged. Under high load, electric power is supplied from storage battery B to increase the assisting driving force of motor generator MG2. During braking, motor generator MG2 is driven by driving wheels 6 to carry out regenerative braking to thereby recover kinetic energy as electric power.

Engine 1 includes a plurality of cylinders and fuel injection valves 13 provided in a one-to-one correspondence with the plurality of cylinders. The vehicle includes motor generator MG1 for forcibly rotating crankshaft 26. Control device 9 of the internal combustion engine controls the respective fuel injection valves so that an injection quantity of a last injection becomes smaller than an injection quantity of a first injection out of injection quantities of fuel injected in order into the respective cylinders in a first fuel injection cycle from a stop state of crankshaft 26 to the end of a first fuel injection from each of the fuel injection valves.

In FIG. 1, one of the plurality of cylinders of engine 1 is shown as a representative. In practice, the number of cylinders is 4, 6, 8, or the like. Hereinafter, a case where the number of cylinders is 4 will be described as an example.

Figure 2:
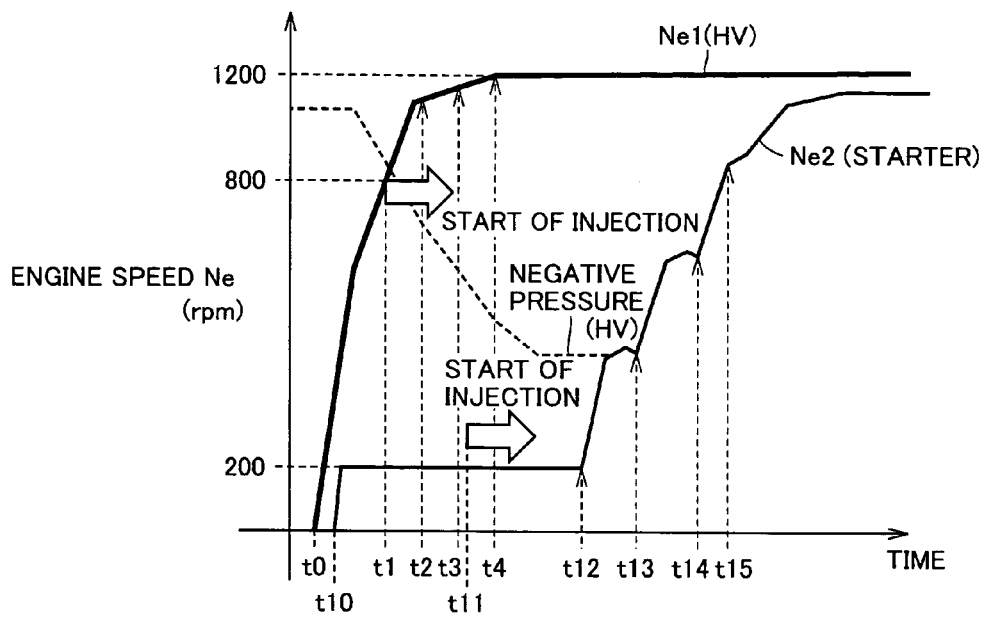
FIG. 2 is a drawing for explaining a difference in speed variation at an engine start time between a hybrid vehicle and a conventional vehicle.

FIG. 2 is a drawing for explaining a difference in speed variation at an engine start time between a hybrid vehicle and a conventional vehicle.

With reference to FIG. 2, in the conventional vehicle, the engine is first rotated at an engine speed of about 200 rpm by a starter motor between times t10 and t12 as shown by a speed Ne2. At this time, fuel is injected into a cylinder #1 at time t11 and ignition of the same is carried out at time 12. By this ignition the engine speed increases, and ignition is carried out in order in cylinders #3, #4, #2 at times t13, t14, and t15 thereafter. As a result, the speed gradually increases in stages up to a speed close to 1,200 rpm that is an idle frequency.

In the hybrid vehicle, on the other hand, driving force of the motor generator for cranking is large. From time t0 to time t1 when the crank angle sensor makes control device 9 identify a phase of the crank angle to start injection, the engine speed has already increased to about 800 rpm. Then, fuel injection into cylinder #1 is started at time t1, ignition is carried out in cylinder #1 at time t2, and thereafter ignition is carried out in order in respective cylinders at t3, t4.

From time t1 to time t4, vaporization time changes little because the engine speed is already high, but the negative pressure is gradually built up as shown in a broken line in FIG. 2. Therefore, between time t1 and time t4, later injection is more advantageous for vaporization of the fuel.

Figure 3:
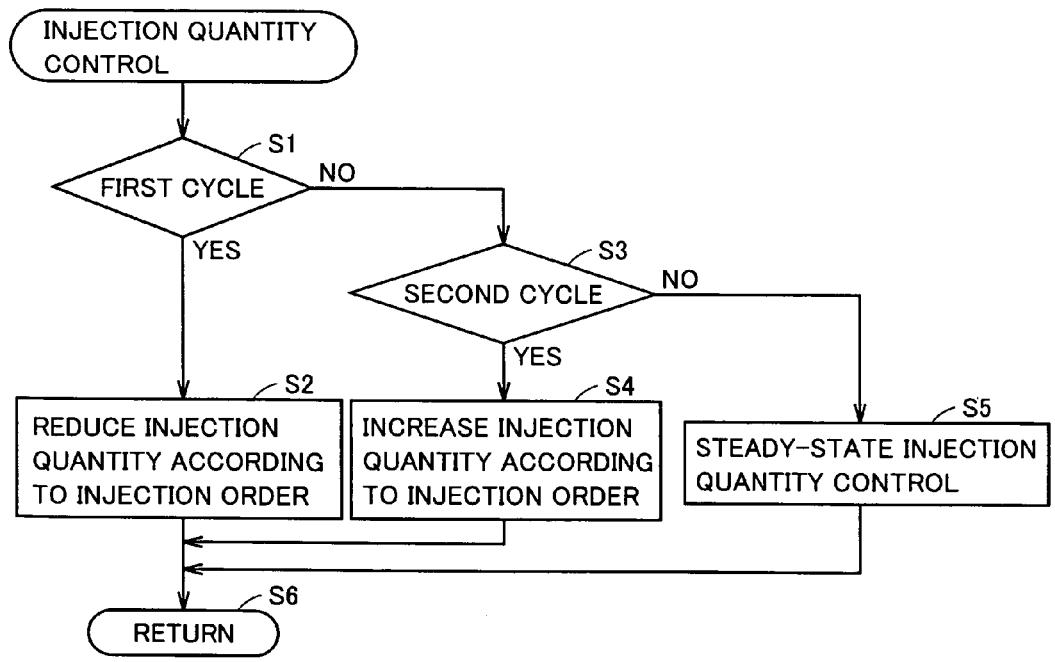
FIG. 3 is a flow chart showing a control configuration of a program on control of an injection quantity and run in a control device 9.

FIG. 3 is a flow chart showing a control configuration of a program on control of an injection quantity and run in control device 9. Processing of this flow chart is invoked from a main routine and performed every certain time period or every time a predetermined condition is satisfied.

With reference to FIGS. 1 and 3, if this injection quantity control processing is started, control device 9 first rotates crankshaft 26 by using motor generator MG1 and detects rotation of the crankshaft by using crank angle sensor 34.

Then, in step S1, whether or not fuel injection in a first cycle for which fuel injection has not yet been started is to be carried out now is determined. If the fuel injection in the first cycle is to be started now, the processing goes to step S2. If the fuel injection in the first cycle has already been finished, the processing goes to step S3.

Figure 4:
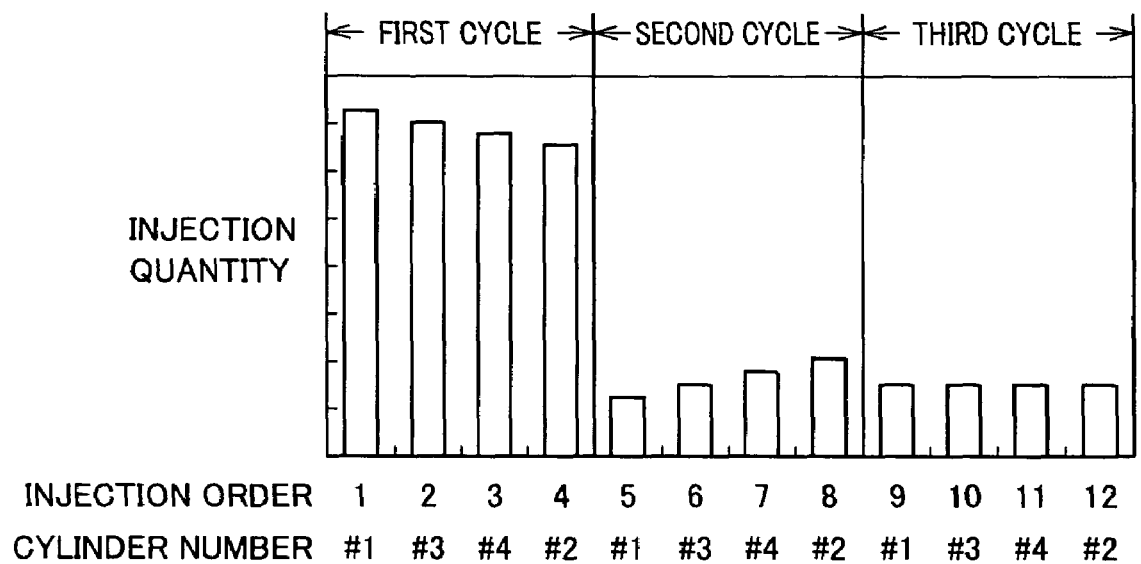
FIG. 4 is a drawing for explaining variation of injection quantity for each cylinder at an engine start time.

FIG. 4 is a drawing for explaining variation of injection quantity of each cylinder at an engine start time.

In step S2, injection in the first cycle shown by ranks 1, 2, 3, and 4 of an injection order in FIG. 4 is carried out into respective cylinders #1, #3, #4, and #2. In this case, in accordance with the injection order, the injection quantity is reduced in order.

With reference to FIG. 3 again, when the processing in step S2 is finished, the processing moves to the main routine in step S6.

On the other hand, if the processing goes from step S1 to step S3, whether or not fuel injection to be carried out now is processing in the second cycle is determined. If the fuel injection to be carried out now is injection in the second cycle, the processing goes to step S4. If the injection in the second cycle has already been finished, the processing goes to step S5.

In step S4, fuel injection of ranks 5, 6, 7, and 8 of the injection order as shown in the second cycle in FIG. 4 is carried out into respective cylinders #1, #3, #4, and #2. In injection in the second cycle, the fuel injection quantity is gradually increased in accordance with the injection order.

In the first cycle, the engine speed is high and there is not much difference in the vaporization time among the four cylinders, but the negative pressure in the intake port is gradually built up as the engine rotates. Therefore, the rank 4 has an advantage in vaporization of the fuel over the rank 1 of the injection order. Therefore, a requested injection quantity for cylinder #1 in rank 1 of the injection order is greater than that for cylinder #2 in rank 4 of the injection order.

Reversely, in the second cycle, the negative pressure in the intake port approaches steady-state pressure and there is no difference in the condition for vaporization among ranks of the injection order. On the other hand, a quantity of fuel that adheres to an inside of the intake port is greater in cylinder #1, where the greater quantity of fuel was injected in the first cycle, than in cylinder #2. Therefore, the requested injection quantity for cylinder #1 in rank 1 of the injection order is smaller than that for cylinder #2 in rank 4 of the injection order.

On the other hand, in FIG. 3, if the processing goes from step S3 to step S5, steady-state injection quantity control is carried out. For example, as shown in the third cycle in FIG. 4, the injection quantities for the respective cylinders are uniform irrespective of the ranks of the injection order.

In other words, in the first cycle, the quantity of fuel that adheres to the intake port is reduced gradually in descending ranking of the injection order because the negative pressure is built up. In the second cycle, on the other hand, the fuel that adhered to the intake port in the first cycle is vaporized in such a manner that the adhesion quantities in the respective cylinders become uniform. Therefore, the injection quantities for the respective cylinders may be set to be equal in the sum of the injection quantities in the first cycle and the second cycle, for example. If the negative pressure in the intake port has not yet become stable in the second cycle, the injection quantities for the respective cylinders may be set to be equal in the sum of the injection quantities in the first to third cycles.

The injection quantities shown in FIG. 4 may be controlled by using a map or the like to be adapted to parameters affecting the vaporization of the fuel, e.g., temperature, an opening degree of throttle, a VVT (variable valve timing) advance angle, and a swirl control valve.

If vaporization of fuel that has adhered to the wall face advances, the injection quantity required to maintain the air-fuel ratio at the stoichiometric air-fuel ratio or at a slightly leaner ratio becomes smaller. A target value of the sum of the injection quantities for the first to second or third cycles becomes smaller.

In other words, the sum of the fuel injection quantities is a function of the parameters affecting the vaporization of the injected fuel.

A typical parameter among these parameters is engine coolant temperature. The higher the engine coolant temperature is, the more the vaporization of the fuel from the wall face advances. Therefore, the higher the engine coolant temperature is, the smaller the target value of the sum of the injection quantities becomes.

As other parameters, there are the opening degree of the throttle valve provided in the intake port, a valve overlap quantity between the intake valve and the exhaust valve, an assist air quantity when an air-assist type fuel injection valve is used as the fuel injection valve, temperature of fuel to be injected, intake air temperature, and the like. At least one selected from these is used as a parameter determining the fuel injection quantity.

The throttle valve is provided for controlling a flow path cross-sectional area in the intake port, for example. If the opening degree of the throttle valve becomes smaller, flow velocity of the intake air flowing into the combustion chamber becomes higher to facilitate vaporization of the fuel from the wall face. In this case, the parameter is an inverse of the opening degree of the throttle valve.

On the other hand, if the valve overlap quantity between the intake valve and the exhaust valve becomes larger, a blow-back quantity of burned gas into the intake port increases to facilitate vaporization of the fuel that has adhered to the wall face. Therefore, in this case, the parameter is the valve overlap quantity.

If the air-assist type fuel injection valve is used, atomization of the injected fuel is facilitated and the quantity of fuel adhering to the wall face is reduced as the assist air quantity increases. Therefore, in this case, the parameter is the air assist quantity.

The atomization of the injected fuel is facilitated and the quantity of fuel adhering to the wall face reduces as the temperature of fuel to be injected increases. Therefore, in this case, the parameter is the temperature of the fuel.

The atomization of the injected fuel is facilitated and the quantity of fuel adhering to the wall face reduces as the temperature of intake air increases. Therefore, in this case, the parameter is the intake air temperature.

If influences of a plurality of parameters on advancement of vaporization of the fuel are taken into consideration, the fuel injection quantity is determined according to the product of values obtained based on the respective parameters.

Figure 5:
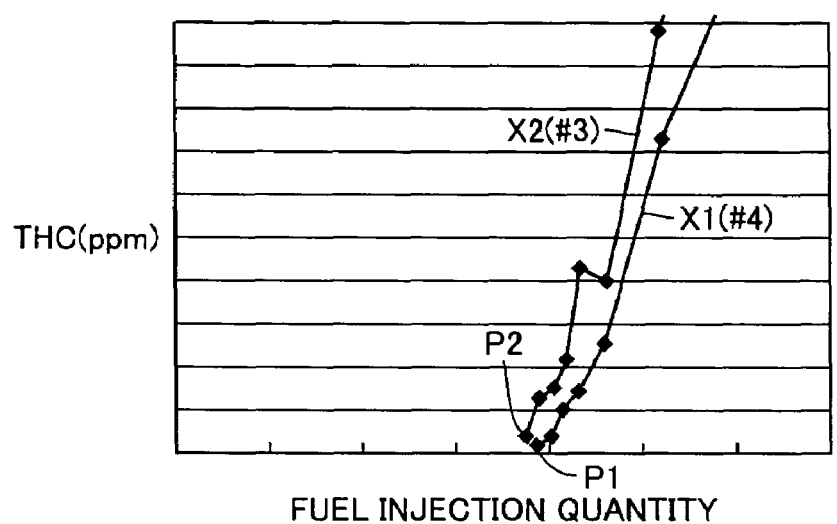
FIG. 5 is a drawing for explaining effects of an invention according to an embodiment 1.

FIG. 5 is a drawing for explaining effects of the invention according to the embodiment 1.

FIG. 5 shows a graph X1 showing HC concentration when the injection quantity of the first injection in the first cycle is changed and a graph X2 showing HC concentration when the injection quantity of the fourth injection is changed while fixing the throttle opening degree at 5° and selecting 15° after the top dead center as the ignition timing.

The graph X1 shows a case of injection into cylinder #4 and the graph X2 shows a case of injection into cylinder #3. Although the experiment was carried out while setting a position for starting the engine rotation at the time of the experiment in such a position that cylinder #4 corresponds to the first injection, the similar tendency is considered to be shown if the start position is set in such a position that cylinder #1 corresponds to the first injection as shown in FIG. 4.

In FIG. 5, if a quantity shown by a point P1 is selected as the injection quantity for the first injection and a quantity shown by a point P2 is selected as the injection quantity for the fourth injection, clean combustion with an HC concentration of 1000 ppm or lower is possible from the first ignition of the first injection after the starting. In other words, if the injection quantity for the fourth injection is set to be smaller than that for the first injection, clean combustion with a low HC concentration can be obtained.

If the engine is started with a closed throttle opening degree at the start time so as to build up the negative pressure at the start time, a condition further suitable for vaporization of the fuel can be obtained.

As described above, in the embodiment 1, the injection quantity is adapted to the case where fuel injection is carried out from the time immediately after the start of the engine in the vehicle mounted with the motor having performance for increasing the cranking speed at a dash. Therefore, the emission of HC can be decreased in a hybrid vehicle and the like.

Embodiment 2

In an embodiment 2, in addition to control of the fuel injection quantity specified in the embodiment 1, at the start time of the engine, the parameters, e.g., the throttle opening degree and the VVT advance angle, affecting the fuel vaporization are not changed until adhesion of the fuel to the intake port is stabilized, e.g., until around a time point of the end of the second cycle in FIG. 4, or until the negative pressure is stabilized. Especially in a case of an electric VVT with that a valve timing can be controlled from the time before the engine starting by an electric actuator, the parameters are not changed until the above state is obtained after the start of the engine.

Figure 6:
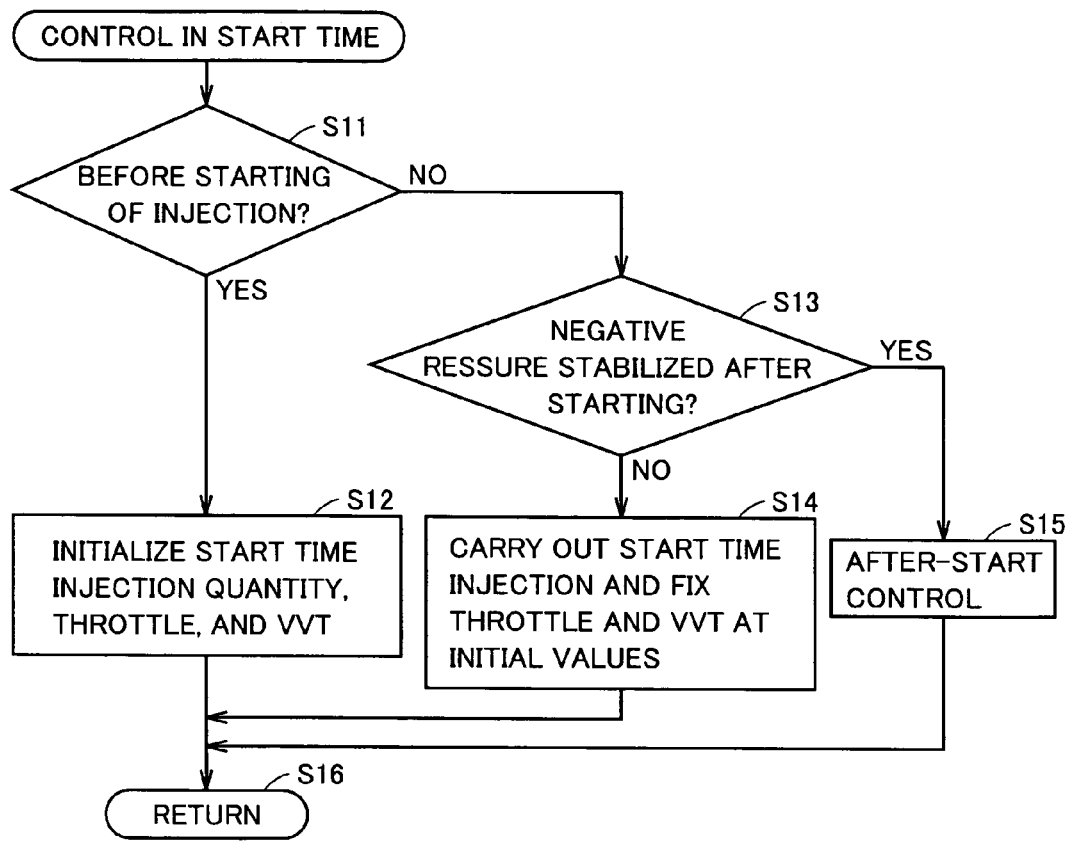
FIG. 6 is a flow chart showing a control configuration of a program for performing a start time control performed according to an embodiment 2.

FIG. 6 is a flow chart showing a control configuration of a program for carrying out a start time control performed according to embodiment 2. The processing of this flow chart is invoked from a main routine and performed every certain time period or every time a predetermined condition is satisfied.

With reference to FIG. 6, if this start time control is started, whether or not it is before starting of the first injection is determined first in step S11.

In step S11, if it is determined that it is before starting of the first injection, the processing goes to step S12. If it is after starting of the first injection, the processing goes to step S13.

In step S12, a start time injection quantity, the throttle opening degree, and the VVT advance angle are initialized. Then, in the following step S16, the processing returns to the main routine.

On the other hand, if the processing goes from step S11 to step S13, whether or not the negative pressure in the intake port has been stabilized after the start is determined.

This determination with regard to the negative pressure may be made based on a fact that the negative pressure has been built up to a predetermine pressure or a fact that variation of the negative pressure has become smaller than a predetermined quantity by detecting the negative pressure using negative pressure sensor 12 mounted to the intake pipe, for example, or may be made by estimating the negative pressure from the opening degree of the throttle valve, output of air flow meter 33, the VVT advance angle, and atmospheric pressure, for example.

If it is determined that the negative pressure has been stabilized in step S13, the processing goes to step S15. If it is determined that the negative pressure has not yet been stabilized, the processing goes to step S14.

In step S14, start time injection is carried out according to the injection quantities shown in FIG. 4. At this time, the throttle opening degree and the advance angle of the VVT is fixed at initial values determined in step S12.

On the other hand, in step S15, because it is after the negative pressure has been stabilized, after-start control in that the throttle opening degree and the advance angle of the VVT are determined based on a driver's request for acceleration and the engine speed is carried out.

After the processing in step S14 or S15 is carried out, the processing is moved to the main routine in step S16.

Figure 7:
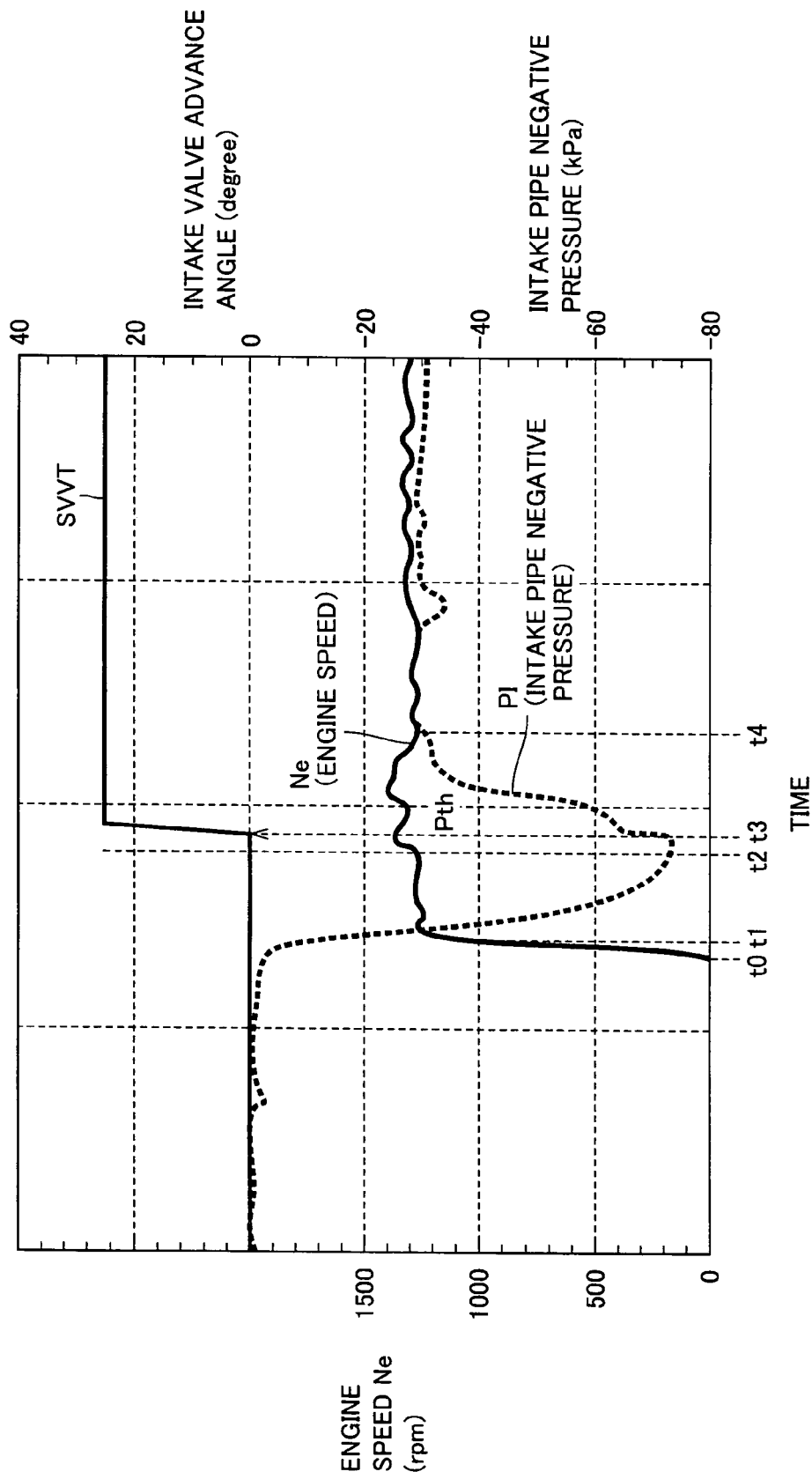
FIG. 7 is a drawing for explaining a controlled state of an engine for which processing according to the embodiment 2 is performed.

FIG. 7 is a drawing for explaining a control state of an engine for which the processing according to the embodiment 2 is performed.

With reference to FIG. 7, cranking of the engine in motor generator MG1 is first started at time t0. Then, the first injection of the fuel is started at time t1 and start time injection is carried out, and the opening degree of the throttle valve and the advance angle of the VVT are fixed at the initial values between times t1 and t2 as shown in step S14 in FIG. 6. Thus, conditions for fuel burning are stabilized at the start time of the engine and therefore an HC emission quantity is stably reduced.

Then, after the negative pressure in the intake port is stabilized at time t3, the throttle valve opening degree and the VVT advance angle are controlled according to the requested values in step S15 in FIG. 6. As a result, the advance angle of the intake valve is changed from 0° to 25° and the negative pressure PI in the intake pipe increases between times t3 and t4. Then, from time t4 onward, a stable idling state can be achieved.

As described above, in the embodiment 2, in addition to the effects described in the embodiment 1, the control variables affecting the vaporization of the fuel are fixed at the start and therefore the HC emission quantity hardly varies every time to thereby stably reduce the HC emission quantity.

Embodiment 3

According to an embodiment 3, at the start of the engine, the engine speed is controlled to be a constant speed by motor generator MG1 until adhesion of the fuel to the intake port is stabilized, e.g., until the second cycle of the fuel injection is finished, or until the negative pressure is stabilized. Then, after the negative pressure is stabilized, the engine speed is freed.

Figure 8:
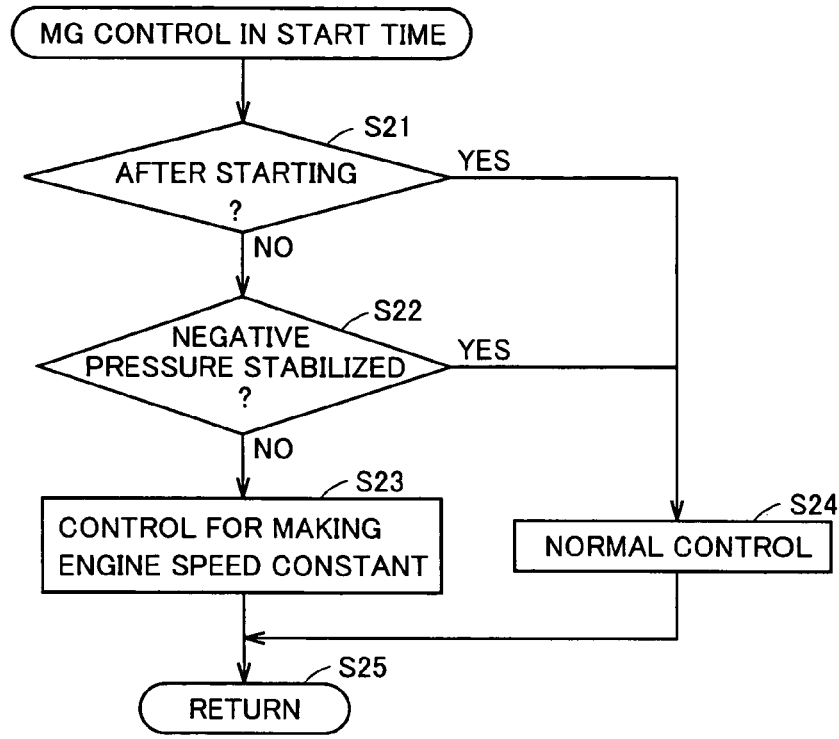
FIG. 8 is a flow chart showing a control configuration of a program performed according to an embodiment 3.

FIG. 8 is a flow chart showing a control configuration of a program performed according to embodiment 3.

With reference to FIG. 8, if a motor generator control at the start time is started first, whether or not it is at the start time is determined in step S21. If it is already after the starting in step S21, the processing goes to step S24. On the other hand, if it is at the start time, the processing goes to step S22.

In step S22, whether or not the negative pressure in the intake port has been stabilized is determined. This determination may be made by measuring the negative pressure using negative pressure sensor 12 in FIG. 1 or by estimating the negative pressure from the air flow meter and the throttle valve opening degree as described in embodiment 2. It is also possible to determine based on whether or not the predetermined number of injection cycles, e.g., two cycles, have elapsed.

If it is determined that the negative pressure in the intake port has been stabilized in step S22, the processing goes to step S24. On the other hand, if it is determined that the negative pressure has not yet been stabilized in step S22, the processing goes to step S23.

In step S23, the engine speed is controlled to be constant by using motor generator MG1. On the other hand, in step S24, the engine is subjected to the normal control for the hybrid automobile in that the engine speed changes according to a vehicle load, the acceleration request, and the like.

If the processing in step S23 or S24 is finished, the control is returned to the main routine in step S25.

Figure 9:
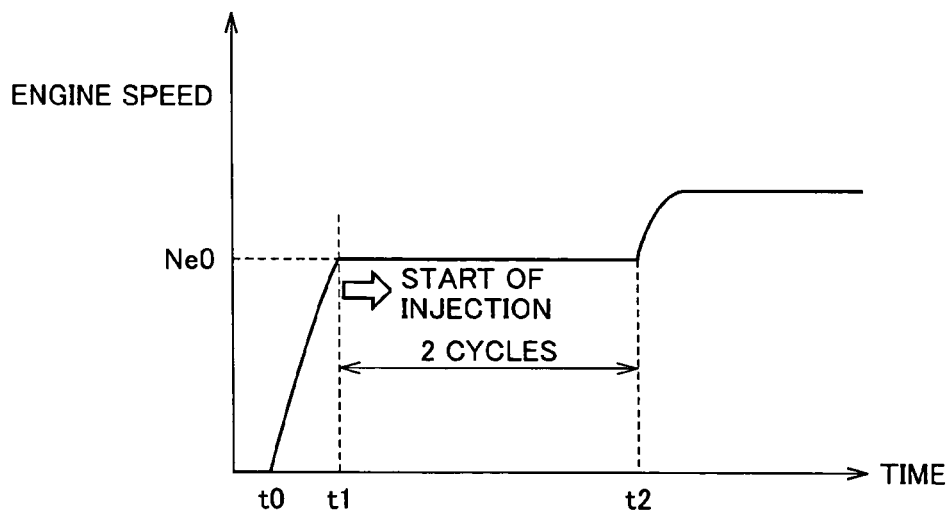
FIG. 9 is a drawing for explaining variation of an engine speed according to embodiment 3.

FIG. 9 is a drawing for explaining variation of the engine speed according to embodiment 3.

As shown in FIG. 9, between times t0 and t1, the crankshaft of the engine is rotated by motor generator MG1 according to a request for starting the engine. If the crank rotation angle is identified by control device 9, the fuel injection is started at time t1. Then, between times t1 and t2, for example for two cycles (8 injections) of the fuel injection, the control is carried out by motor generator MG1 to maintain the engine speed at a constant value Ne0 (step S23). A period between times t1 and t2 is not limited to 2 cycles but may be a time period that elapses until it is determined by the negative pressure sensor that the negative pressure has been stabilized, for example. By controlling the engine speed to the constant value at the start time, variation in the emission quantity of hydrocarbon can be reduced to stably achieve reduction in the HC emission quantity. Because the motor generator controls only for about two cycles after the starting, it hardly has an adverse effect on detection of misfire of the engine.

From time t2 onward, the normal control in step S24 is carried out (step S24).

Embodiment 4

According to embodiment 4, a stop crank angle of the engine is controlled to be within a predetermined range by using motor generator MG1 during control of the engine speed to the constant value. To cope with slight deviation of the stop position, the injection quantity is changed at a next starting according to a quantity of the position deviation.

Figure 10:
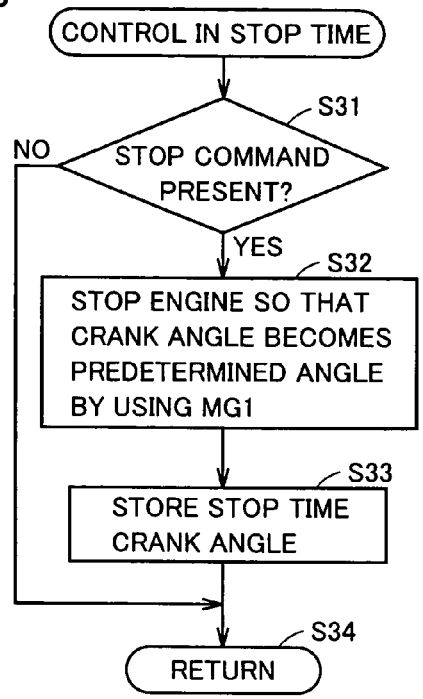
FIG. 10 is a flow chart for explaining control at a stop time according to an embodiment 4.

FIG. 10 is a flow chart for explaining control at a stop time according to embodiment 4.

With reference to FIG. 10, presence or absence of a command for stopping the engine is first checked in step S31. It is determined that a stop command is present when a driver turns off an ignition switch or when control device 9 makes a transition from driving while operating the engine to EV driving while stopping the engine and using motor generator MG2, for example.

If it is determined that the stop command is absent in step S31, the processing goes to step S34 and the control is moved to the main routine. On the other hand, if it is determined that the stop command is present in step S31, the processing goes to step S32.

In step S32, the stop position of the engine is controlled by using motor generator MG1 so that the crank angle of the engine becomes a predetermined angle. At this time, control device 9 in FIG. 1 controls inverter 7, drives motor generator MG1, and rotates the crankshaft until a predetermined crank angle is obtained while monitoring output of crank angle sensor 34 even after fuel supply to the engine has been stopped.

Then, in order to correct the deviation from a target angle at the start time, an actual stop crank angle is read from the output of crank angle sensor 34 and stored in memory in control device 9 in step S33.

Then, the processing goes to step S34 and the control is moved to the main routine.

FIG. 1 is a flow chart for explaining control at a start time according to embodiment 4.

Figure 11:
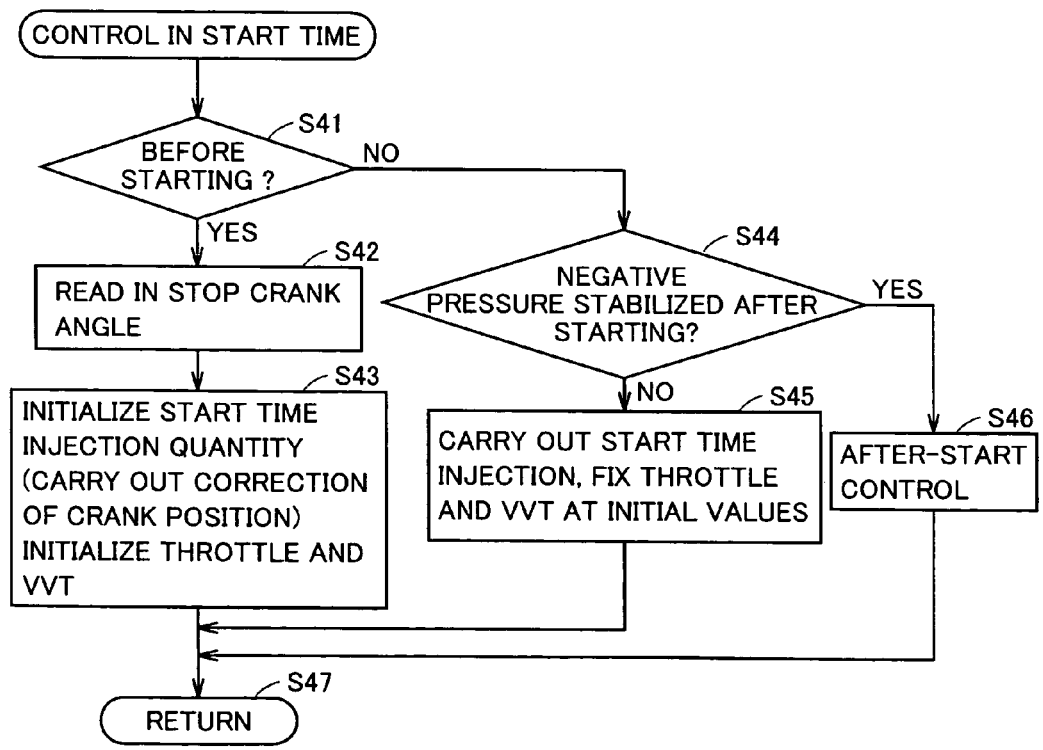
FIG. 11 is a flow chart for explaining control at a start time according to embodiment 4.

With reference to FIG. 11, if the start time control is started first, whether the starting processing is to be carried out now or the starting processing has already been carried out is determined in step S41. If it is before the starting, the processing goes to step S42. On the other hand, if the starting processing has already been carried out, the processing goes to step S44.

In step S42, the crankshaft is in a stopped state. Because a reference position can be identified by the crank angle sensor only a while after the starting, it is impossible to read in the present crank angle. Therefore, control device 9 reads in the stop crank angle that was stored in step S33 in FIG. 10 from the memory.

The four cylinders are carrying out any of four strokes, i.e., compression, intake, combustion, and exhaust. With regard to the cylinder in the midst of the compression stroke out of the four cylinders, resistance of initial cranking is different depending on the position of the cylinder at the stop time. For example, when the cylinder has stopped in a vicinity of the bottom dead center, a quantity of air corresponding to a stroke of the cylinder is compressed and therefore the resistance is high. On the other hand, if the cylinder has stopped at an intermediate portion of the stroke, because air in the combustion chamber compressed during the stoppage has leaked from a clearance in the cylinder, the resistance to rotation is reduced by a quantity corresponding to the leakage.

Then, in step S43, the deviation of the stop position is corrected and the injection quantity, the throttle valve opening degree, and the VVT advance angle at the start time are initialized. Resistance to the first rotation is different between a case where a compression quantity is large and a case where the compression quantity is small in the cylinder where the compression stroke is to be carried out now out of the four cylinders, for example. Therefore, if the resistance is high, the engine speed is considered to be reduced and the negative pressure is considered to be low, thereby to increase the requested injection quantity. The injection quantity may be reduced in the second cycle by a quantity corresponding to the increase in the injection quantity in the first cycle.

On the other hand, if the processing goes from step S41 to S44, whether or not the negative pressure in the intake port has been stabilized after the starting is determined.

This determination of the negative pressure may be made based on a fact that the negative pressure has been built up to a predetermine pressure or a fact that variation of the negative pressure has become smaller than a predetermined quantity by detecting the negative pressure using negative pressure sensor 12 mounted to the intake pipe, for example, or may be made by estimating the negative pressure from the opening degree of the throttle valve, output of air flow meter 33, the VVT advance angle, and atmospheric pressure, for example.

If it is determined that the negative pressure has been stabilized in step S44, the processing goes to step S46. If it is determined that the negative pressure has not yet been stabilized, the processing goes to step S45.

In step S45, the start time injection is carried out with injection quantities obtained by correcting in step S43 the injection quantities shown in FIG. 4. At this time, the throttle opening degree and the VVT advance angle are fixed at initial values determined in step S43.

On the other hand, in step S46, because it is after the negative pressure has been stabilized, after-start control in that the throttle opening degree and the advance angle of the VVT are determined based on a driver's request for acceleration and the engine speed is carried out.

After the processing in any of the steps S43, S45, and S46 is finished, the processing goes to step S47 and the control is moved to the main routine.

As described above, according to embodiment 4, variation in the HC emission can be further reduced to stably achieve reduction in the HC emission.

Although the example of the internal combustion engine in that the fuel is injected into the intake port has been described in each of embodiments 1 to 4, the invention can also be applied to the internal combustion of in-cylinder injection.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of an internal combustion engine mounted on a vehicle, wherein
the internal combustion engine includes:
a plurality of cylinders, and
fuel injection valves provided correspondingly to the plurality of respective cylinders,
the vehicle includes:
a first rotating electric machine for forcibly rotating a crankshaft of the internal combustion engine,
the control device of the internal combustion engine controls the respective fuel injection valves so that an injection quantity of a last injection becomes smaller than an injection quantity of a first injection out of injection quantities of fuel injected in order in correspondence with the respective cylinders in a first cycle of fuel injection from a stopped state of the crankshaft to an end of a first fuel injection from each of the fuel injection valves,
when pressure is substantially equal throughout the plurality of respective cylinders, the control device of the internal combustion engine controls the respective fuel injection valves to increase injection quantity of a last injection in a second cycle.

2. The control device of the internal combustion engine according to claim 1, wherein
the first rotating electric machine is formed to be able to rotate the crankshaft of the internal combustion engine at a speed equal to or greater than an idling speed of the internal combustion engine in a stopped state of operation of the internal combustion engine.

3. The control device of the internal combustion engine according to claim 1, wherein
the vehicle further includes
a second rotating electric machine used together with the internal combustion engine so as to generate torque for rotating a wheel.

4. The control device of the internal combustion engine according to claim 3, wherein
the vehicle further includes
a power split mechanism having three shafts respectively mechanically coupled to the crankshaft of the internal combustion engine, a rotation shaft of the first rotating electric machine, and a rotation shaft of the second rotating electric machine, and formed so that, if rotation speeds of any two of the three shafts are determined, a rotation speed of residual shaft is forcibly determined.

5. The control device of the internal combustion engine according to claim 1, wherein
the control device controls a control variable of the internal combustion engine different from the fuel injection quantity at a constant value until negative pressure in an intake pipe of the internal combustion engine is stabilized.

6. The control device of the internal combustion engine according to claim 5, wherein
the control variable of the internal combustion engine includes an advance angle of a variable valve opening timing.

7. The control device of the internal combustion engine according to claim 5, wherein the control variable of the internal combustion engine includes a valve opening angle of a throttle valve.

8. The control device of the internal combustion engine according to claim 5, wherein the control device retains angle information on the crankshaft at a stop time of the internal combustion engine and determines the constant value of the control variable based on the retained angle information.

9. A control method of an internal combustion engine which is mounted on a vehicle including a first rotating electric machine, and which includes a plurality of cylinders, fuel injection valves provided correspondingly to the plurality of respective cylinders, and a crankshaft, the crankshaft being forcibly rotated by the first rotating electric machine, the method comprising the steps of:
determining whether or not it is a first cycle of fuel injection from a stopped state of the crankshaft to an end of a first fuel injection from each of the fuel injection valves;
determining injection quantities of fuel injected in order in correspondence with the plurality of cylinders so that an injection quantity of a last injection in the first cycle becomes smaller than an injection quantity of a first injection in the first cycle;
determining when a pressure throughout the plurality of cylinders is substantially equal; and
increasing the injection quantity in the last injection in a second cycle when the pressure throughout the plurality of cylinders is substantially equal.

10. The control method of the internal combustion engine according to claim 9, wherein
the first rotating electric machine is formed to be able to rotate the crankshaft of the internal combustion engine at a speed equal to or greater than an idling speed of the internal combustion engine in a stopped state of operation of the internal combustion engine.

11. The control method of the internal combustion engine according to claim 9, wherein
the vehicle further includes
a second rotating electric machine used together with the internal combustion engine so as to generate torque for rotating a wheel.

12. The control method of the internal combustion engine according to claim 11, wherein the vehicle further includes
a power split mechanism having three shafts respectively mechanically coupled to the crankshaft of the internal combustion engine, a rotation shaft of the first rotating electric machine, and a rotation shaft of the second rotating electric machine, and formed so that, if rotation speeds of any two of the three shafts are determined, a rotation speed of residual shaft is forcibly determined.

13. The control method of the internal combustion engine according to claim 9, the method further comprising the steps of:
determining whether or not negative pressure in an intake pipe of the internal combustion engine has been stabilized; and
controlling a control variable of the internal combustion engine different from the fuel injection quantity at a constant value when the negative pressure has not been stabilized.

14. The control method of the internal combustion engine according to claim 13, wherein
the control variable of the internal combustion engine includes an advance angle of a variable valve opening timing.

15. The control method of the internal combustion engine according to claim 13, wherein
the control variable of the internal combustion engine includes a valve opening angle of a throttle valve.

16. The control method of the internal combustion engine according to claim 13, the method further comprising the step of retaining angle information on the crankshaft at a stop time of the internal combustion engine, wherein
the controlling step determines the constant value of the control variable based on the retained angle information.

* * * * *